(12) United States Patent
Duarte

(10) Patent No.: US 7,565,258 B2
(45) Date of Patent: Jul. 21, 2009

(54) THERMAL SENSOR AND METHOD

(75) Inventor: David E. Duarte, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 11/369,746

(22) Filed: Mar. 6, 2006

(65) Prior Publication Data

US 2007/0216468 A1    Sep. 20, 2007

(51) Int. Cl.
*G01K 1/08* (2006.01)

(52) U.S. Cl. .................. 702/132; 62/3.7; 307/117; 327/513

(58) Field of Classification Search .......... 702/130, 702/132; 327/77, 93, 143, 513; 307/117; 361/103; 62/3.7
See application file for complete search history.

(56) References Cited

U.S. PATENT DOCUMENTS 5,648,741 A * 7/1997 Wichern .............. 327/513
6,006,169 A 12/1999 Sandhu et al.
6,082,115 A * 7/2000 Strnad .............. 62/3.7
6,140,860 A 10/2000 Sandhu et al.
6,975,047 B2 12/2005 Pippin

* cited by examiner

*Primary Examiner*—John H Le
(74) *Attorney, Agent, or Firm*—Schwabe, Williamson & Wyatt, P.C.

(57) ABSTRACT

In one embodiment, an apparatus is constituted with a temperature sensing circuit adapted to be coupled to a current sources circuit, and configured to measure a circuit temperature and to generate a temperature-indicating signal in response to the circuit temperature and an adjustable current output by the current sources circuit; a reference voltage circuit to be coupled the current sources circuit and configured to provide a reference signal in response to a reference current output by the current sources circuit; and a trip generator circuit coupled to the temperature sensing circuit and the reference voltage circuit and configured to generate a trip point signal if a difference between the reference and the temperature-indicating signals indicates that a threshold circuit temperature has been reached or exceeded.

25 Claims, 9 Drawing Sheets

THERMAL SENSOR AND METHOD

BACKGROUND

1. Technical Field

Embodiments of the present invention are related to the field of electronic devices, and in particular, to thermal sensors.

2. Description of Related Art

A thermal sensor may be used, for example, to monitor a temperature of a microprocessor. When the measured temperature exceeds a predetermined temperature threshold, the thermal sensor may alert circuitry of the microprocessor so that corrective action (throttling back or shutting down the microprocessor, for example) may be taken to reduce the temperature. Without the corrective action, the microprocessor may overheat and catastrophic failure of the microprocessor may occur.

Typically, thermal sensors used with microprocessors include a diode and temperature measuring circuitry. The thermal sensor may be directly attached to a substrate (e.g., heat sink) of the microprocessor by way of a thermocouple or the diode may be embedded in the integrated circuits of the microprocessor. In operation, the voltage/current characteristics of the diode change, depending upon the temperature of the microprocessor, and the temperature measuring circuitry measures the voltage or current characteristics of the diode.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

Figure 1:
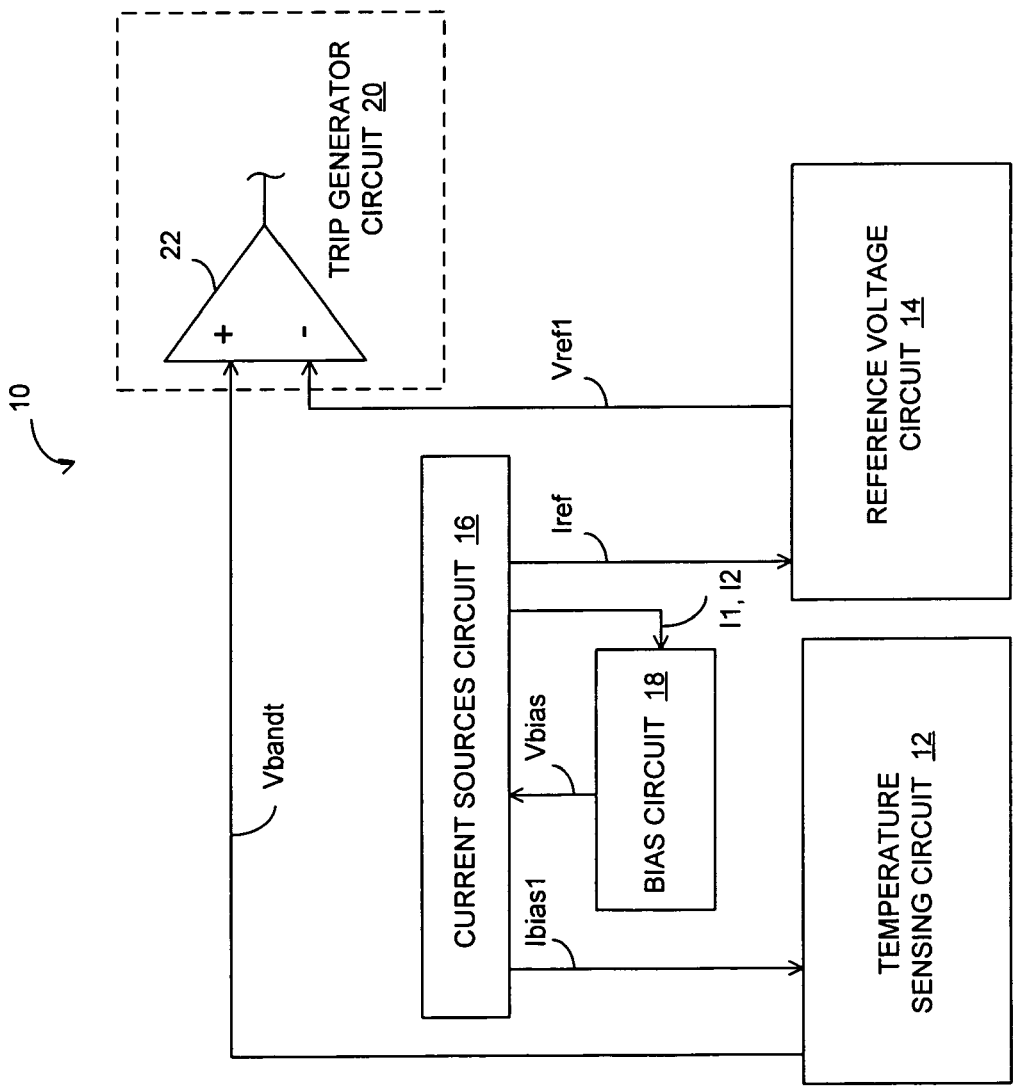
FIG. 1 illustrates a generalized circuit schematic of a thermal sensor according to the various embodiments of the present invention.

Referring to FIG. 1, there is illustrated a thermal sensor 10, according to various embodiments of the present invention. In one embodiment, the thermal sensor 10 may include a temperature sensing circuit 12 to monitor and measure a temperature of an integrated circuit ("circuit temperature") and to generate at least one adjustable temperature-indicating voltage signal Vbandt that changes with the circuit temperature; and a reference voltage circuit 14 to provide at least one reference voltage signal Vref. The reference voltage Vref is not constant with temperature, but is still a reference, in that its dependence with temperature is well defined as a proportional-to-absolute-temperature (PTAT) voltage. In various embodiments, the thermal sensor 10 further includes a current sources circuit 16, coupled to the temperature sensing circuit 12 and the reference voltage circuit 14, to provide at least one adjustable current Ibias1 to the temperature sensing circuit 12 and a reference current Iref to the reference voltage circuit 14; and a bias circuit 18, coupled to the current sources circuit 16, and configured to provide a bias signal Vbias to bias the current sources circuit 16 so that it may generate the currents Ibias1 and Iref.

The thermal sensor 10 may further include a trip generator circuit 20 having at least one trip comparator (illustrated by a trip comparator 22) coupled to the temperature sensing circuit 12 and the reference voltage circuit 14 and configured to assert at least one trip point signal indicating an over temperature condition if a difference between the temperature-indicating voltage signal Vbandt and the reference voltage Vref indicates that a threshold circuit temperature has been reached or exceed. In various embodiments, when the reference voltage Vref substantially equals or exceeds the temperature-indicating voltage signal Vbandt, then the threshold circuit temperature has been reached or exceeded and the trip point signal is generated by the comparator 22. The crossover or trip point at which the reference and temperature-indicating voltages Vbandt and Vref1 are substantially equal correlates with a predetermined threshold circuit temperature of the integrated circuit (IC). More specifically, in one embodiment, the trip comparator 20 may electrically compare the voltage levels of the temperature-indicating voltage signal Vbandt with the reference voltage signal Vref1, and based on the comparison, the trip comparator 20 may either assert, or drive high, its output signal ("trip point signal") to indicate an over temperature condition or deassert, or drive low, its output signal to indicate the temperature is normal or within reasonable limits (no trip point signal). In an illustrative processor application, this comparison may provide the trip point signal, for example, to throttle back the processor, shut off the processor or provide feedback for some other type of cooling system.

The current sources circuit 16, in response to the bias voltage Vbias generated by the bias circuit 18, may provide currents I1 and I2 to the bias circuit 18, current Iref to the reference voltage circuit 14, and current Ibias to the temperature sensing circuit 12, with these currents being relatively constant over temperature and power supply voltages. In one embodiment, the bias circuit 18 and the current sources circuit 16 may form a band-gap delta-Vbe loop (to be described hereinafter).

In one embodiment, the temperature sensing circuit 12 may include at least one circuit branch having in series a diode, a resistor, and a node coupled to the current sources circuit 16 to receive the adjustable current Ibias1. At this node, the temperature-indicating voltage Vbandt is generated. Varying the adjustable current Ibias1 changes the crossing point of the temperature-indicating voltage signal Vbandt and the reference voltage signal Vref1 at which the comparator 22 generates one of the trip point signals when a predetermined threshold circuit temperature is reached. The adjustable current Ibias1 may be dependent upon values of programmable inputs. The temperature-indicating voltage Vbandt may be dependent upon the sensed circuit temperature of the integrated circuit and the adjustable current Ibias1. When the temperature-indicating voltage Vbandt is adjusted by adjusting the adjustable current Ibias1, a substantially linear relationship remains between the reference voltage Vref1 and the temperature-indicating voltage Vbandt. In one embodiment the values of the programmable inputs may be used to undertake a digital trim. In another embodiment, the thermal sensor 10 may generate two or more trip point signals correlating with two or more predetermined threshold circuit temperatures, as will be described in the discussion of FIG. 2. In yet another embodiment, the thermal sensor 10 may include a linear compensation scheme, as will be described in the discussion of FIG. 5.

Referring to FIG. 2, there is provided a more detailed description of the thermal senor 10 of FIG. 1, according to one embodiment of the present invention. In one embodiment generating a single trip point signal, the current sources circuit 16 may include current sources 24 and 25 coupled to the bias circuit 18, current sources 26 coupled to the reference voltage circuit 14, and current sources 28, 30a-30g coupled to the temperature sensing circuit 12. In another embodiment wherein two trip point signals are generated, additional current sources, including current sources 32 and 34a-34g, may be included. In one embodiment, each of the current sources 24-34 may be implemented with a unit current source, with each unit current source being represented by "1×". Hence, the integer numbers N, M, and S in Nx, Mx, and Sx of FIG. 2 indicate the number of unit current sources in the groups of current sources shown in FIG. 2, such as the current sources 24, 25, 26 and so on. For example, there would be M unit current sources 26 coupled to the reference voltage circuit 14, even though only one current source 26 is illustrated in FIG. 2. The current generated by a given current unit may be identified as Iunit. For example, in one embodiment, the integer N may be equal to 12, integer M may be equal to 40, and integer S may be equal to 5; hence, the currents I1 and I2 would equal 12 Iunits and the current Iref would be equal to 40 Iunits. However, with differing conditions, different numbers of current sources are used and these numbers are illustrative of only one example.

In one embodiment, each of the unit current sources 24-34 may include a first PMOS transistor P1 and a second PMOS transistor P2. In one embodiment, each of the unit current sources 24-34 may have a relatively constant channel width and therefore generate the relatively constant current Iunit. As illustrated by one of the unit current source 24 shown in FIG. 2, each of the unit current sources 24-34 may have its source terminal of its transistors P1 coupled to a power supply voltage Vccthermal through the drain-source path of its associated transistor P2, its gate terminal of its transistors P1 coupled to the bias signal Vbias generated by the bias circuit 18, and its drain terminal coupled to one of the circuit branches to be described hereinafter. More specifically, the drains of the transistors P1 of the current sources 24 and 25 may be coupled to the bias circuit 18, the drains of the transistors P1 of the current sources 26 may be coupled to the reference voltage circuit 14, the drains of transistors P1 of current sources 28-34 may be coupled to the temperature sensing circuit 12. The gates of the transistors P2 of the current sources 24, 26, 28 and 32 may be coupled to an enabling signal Ioff and the gates of the transistors P2 of the current sources 30 may be coupled to a register 36 and the gates of the transistors P2 of the current sources 34 may be coupled to a register 38.

The temperature sensing circuit 12 may be programmable, with the additional current sources 30 (illustrated by the current sources 30a-30g) being coupled to the temperature sensing circuit 12 to adjust in relatively small increments the current generated by the unit current sources 28. As previously mentioned, in one embodiment, only one trip point signal may be generated by the trip generator circuit 20. In another embodiment, as shown in FIG. 2, two trip point signals (Thermthrottle and Thermtripped) may be generated by the trip generator circuit 20. For example, the two temperature trip points may be 105 C and 125 C. In the two-trip point embodiment, the current sources circuit 16 may include the additional current sources 32 and the programmable current sources 34a-34g, all coupled to the temperature sensing circuit 12, so as to provide another adjustable current Ibias2 to another circuit branch to be described hereinafter. Moreover, the thermal sensor 10 may include additional circuit branches and current sources to provided more than two trip points. In one embodiment, the current sources circuit may include a capacitor 35 coupled in parallel with the unit current sources.

The bias circuit 18 may include a circuit branch 40 and a circuit branch 42 coupled to the current sources 24 and 25, respectively. The circuit branch 40 may include a diode 44 having a base-to-emitter voltage Vbe1 (forward bias voltage) and may be coupled between the current sources circuit 16 and ground. The branch 42 may include in series a resistor Rb and a diode 46 with a forward bias voltage Vbe2 and may be coupled between the current sources circuit 16 and ground. The bias circuit 18 may include a bias generating comparator (amplifier) 48 having an inverting input terminal coupled to a node 50 to receive the voltage Vbe1 and a non-inverting input terminal coupled to a node 52 to receive the voltage Vbandt. The bias circuit 18 and the current sources circuit 16 may combine to form a band-gap delta-Vbe loop which may keep the diode bias currents $I_1$ and $I_2$ and other currents generated by the current sources circuit 16 mostly constant across temperature.

The reference voltage circuit 14 may include a circuit branch 56 which may have at least a resistor Rvref1 and may be coupled between the current sources circuit 16 and ground. The resistor Rvref1 is all that is needed in the embodiment where there is only one trip point signal generated by the trip generator circuit 20. In the embodiment where two trip point signals are generated by the trip generator circuit 20, then the branch 56 also may include a resistor Rvref2 in series with the resistor Rvref1, as shown in FIG. 2. In another embodiment, a single resistor Rvref1 may be used to generate a single reference voltage for two trip point signals, as will be described hereinafter.

The temperature sensing circuit 12 may include at least one circuit branch 58 having in series a resistor Rdac and a diode 60 with a forward bias voltage Vbe3 and may be coupled between the current sources circuit 16 and ground. In one embodiment, the branch 58 may be identical to the branch 42 of the bias circuit 18. Only the one circuit branch 58 is needed for the embodiment having just one trip signal. Since the thermal sensor 10 is illustrated in FIG. 2 with two trip point signals, a second circuit branch 62 may be included in the temperature sensing circuit 12. In one embodiment, the circuit branch 62 may be identical to branch 58; hence, it may include the resistor Rdac and the diode 60 and may be coupled between the current sources circuit 16 and ground. In one embodiment, each of the resistors Rb, Rvref1, Rvref2 and Rdac may be a GBNwell (Gate-blocked N-type well) resistor. In one embodiment, since the circuit branches 42, 58, and 62 may be identical, each of the diodes 46 and 60 may have an area aspect of 10×. In other words, in one embodiment, the emitter base area may be 10 times greater than the area of the diode 44, which is shown as 1×.

As previously mentioned, the trip generator circuit 20 may include at least one comparator, which is the trip comparator 22. The trip comparator 22 may have an inverted input coupled to a node 64 of the branch 58 to receive the temperature-indicating voltage Vbandt and a non-inverted input coupled to a node 66 to receive the reference voltage Vref1. As previously mentioned, for each trip point signal generated, a trip comparator may be used. Since two trip point signals are illustrated in FIG. 2, another trip comparator, trip comparator 68, may be included. The trip comparator 68 may have a non-inverted input coupled to a node 71 of the branch 56 to receive the referenced voltage Vref2 and an inverted input coupled to a node 72 of the branch 62 to receive another temperature-indicating voltage Vbandc. With the two trip point signal embodiment, the first trip point signal output of the trip comparator 22 may be fed through a level shifter 74 to an AND gate 76 and the second trip point signal output of the trip comparator 68 may be fed through a level shifter 78 to an AND gate 80. A signal Enable also may be coupled to the inputs of AND gates 76 and 80. When enabled, the AND gate 76 may generate the output signal Thermthrottle to throttle down a clock frequency of the processor, for example. When enabled, the AND gate 80 may generate the output signal Thermtripped through a timer delay element 82, which works as a filter, to shut off the processor.

In another embodiment, a single resistor Rvref1 may be used to generate a single Vref1 reference for the two trip points. In this alternative embodiment, the trip temperatures for Thermthrottle and Thermtripped may be solely determined by their corresponding register values in registers 36 and 38, respectively. In this alternative embodiment, the non-inverted input of the trip comparator 68 may be coupled to the branch 56 to receive the referenced voltage Vref1. To the contrary, in the embodiment of FIG. 2, there may be a fallback operating mode that the values in both of the register 36 and 38 being identical. Since the register values are the same, this necessitates the shift between the two trip points being generated by having two different reference voltages. By choosing different reference voltages Vref1 and Vref2, two sensors are formed, with two non-overlapping operating ranges.

In the two trip point signal embodiment, the reference voltage circuit 14 may be constructed to set the reference voltages Vref1 and Vref2 (each generically referred to as voltage "Vref"). The voltages Vbe1, Vbe2 and Vbe3 (each generically referred to as voltage "Vbe") represent the forward voltages across pn junctions (represented by diodes 44, 46 and 62, respectively). The forward potential across a pn junction varies approximately linearly and inversely with respect to temperature. As a result, as the temperature of the IC containing the diodes (or the substrate to which the diodes are coupled via a thermocouple) rises, the voltage level Vbe drops in an inverse relationship. For example, the voltages Vbe1 and Vbe2 may be expressed by the following equations:

$$vbe_1 = \frac{nkT}{q}\ln\left(\frac{I_1}{Is_1}\right)$$

$$vbe_2 = \frac{nkT}{q}\ln\left(\frac{I_2}{Is_2}\right)$$

Equations 1 where k is the Boltzman's constant, T is the absolute temperature of the pn junction, q is the electrical charge, $I_1$ is the current through the branch 40, $I_2$ is the current through branch 42, n is the emission coefficient, and the terms $\ln(I_1/Is_1)$ and $\ln(I_2/Is_2)$ are scaling factors for the emitter cross-sectional areas. More specifically, Is is a scale factor called the saturation current and kT/q is a thermal voltage. In the following discussion, the integer N in the Nx number of unit current sources 24 and 25 is assumed to be 1; hence, the current $I_1$ is substantially equal to $I_2$.

In one embodiment, the bias generating comparator 48 of the bias circuit 18 may be an operational amplifier having an offset voltage Voff, which is illustrated in FIG. 2 as being separate from the comparator 48 but is in fact part of the comparator 48. The comparator 48 may form a closed loop through the current sources 24 and 25. Hence, the Vbe node 50 and Vband node 52 may be kept at virtually the same voltage level (plus the voltage offset Voff). This closed loop condition may generate the following equation:

$$vbe = vband + voff \qquad \text{Equation 2}$$

By using the diode Equations 1 and knowing that the current delivered by each current source 24 or 25 is the same ($I_1 = I_2$), then an expression for this current ($I_2 = I_1$) is obtained and expressed in the following equation:

$$I_2 = I_1 = \left(\frac{nkT}{q}\ln(N) - voff\right) \cdot \frac{1}{Rb} \qquad \text{Equation 3}$$

Equation 3 illustrates the linear dependence of the current $I_2$ with temperature T, with the other terms being either physical constants (n, k, q) or non-varying terms of the circuit (ln(N)). The resistor Rb has a temperature coefficient, which makes the resistance increase with temperature. In some embodiments, the ratio of nkT/q(lnN) and the temperature coefficient of Rb is such that I2=I1 may be relatively constant across the temperature range of interest.

The level of the bias voltage Vbias sets the current through the unit current sources 24-34 and, since all of unit current sources are connected to the bias voltage Vbias, they may all have substantially the same unit current. For example, since there are M unit current sources 26 (only one illustrated), the reference current Iref flowing into the branch 56 of the reference voltage circuit 14 (and therefore flowing through the Rvref1 and Rvref2 resistors) is M times larger than the unit current which flows from a single unit current source, as previously described. In the embodiment where only one trip point signal is generated (and therefore Vref1=Vref in the following Equation 4), the voltage Vref is generated in accordance with the following Equation 4, with the voltage Vref being a PTAT voltage. The voltage Vref may be PTAT because the ratio Rvref/Rb may eliminate the impact of the temperature variations in the resistor.

$$Vref(T) = M \cdot I_2(T) \cdot Rvref(T) \quad \text{Equation 4}$$

$$Vref(T) = M \cdot \left(\frac{nkT}{q}\ln(N) - Voff\right) \cdot \frac{Rvref\,|_{T=T0}}{Rb\,|_{T=T0}}$$

The voltage Vbe of the bias circuit 18 may be defined by the following equation:

$$vbe = \frac{nkT}{q}\ln\left(\left(\frac{nkT}{q}\ln(N) - voff\right) \cdot \frac{1}{Rb \cdot Is_1}\right) \quad \text{Equation 5}$$

Figure 3:
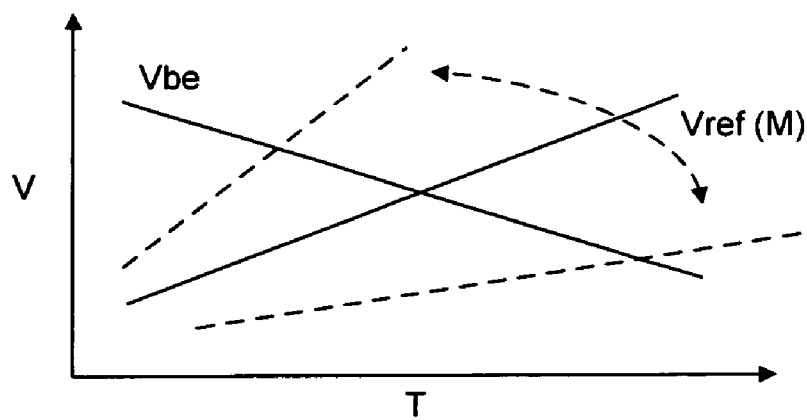
FIG. 3 illustrates a plot of voltage Vbe versus a variable voltage Vref(M), which shows a non-linear relationship between them when M is varied, in various embodiments.

Referring to FIG. 3, there is illustrated a plot of how the voltages Vbe1 and Vref (M) (e.g., voltage Vref1 or Vref2), with the reference voltage Vref (M) being a function of an integer number M of unit current sources 26 (Mx represents the reference current Iref). Whereas the voltage Vbe decreases with increasing circuit temperature, the voltage Vref(M) increases with increasing circuit temperature. Note how the crossing points of the voltage Vbe graph and the voltage Vref graph changes with the integer M. Since the voltage Vref is not shifted but "rotated", intrinsic non-linearity may be introduced. This may occur because the voltage Vref is pivoted around 0° K, which causes the linearity (in C/bit) not to be uniform and may introduce an error that follows a parabolic curve. Hence, varying the voltage Vref as a function of the integer M does not provide a desirable way to vary the crossing point (and therefore the predetermined threshold circuit temperature) at which the comparator 22 generates a trip signal.

To avoid the above described non-linearity, the thermal sensor 10, according to one embodiment of the present invention, may compare the PTAT voltage Vref1 against the adjustable voltage Vbandt using the comparator 22. The voltage Vbandt may be obtained by providing an adjustable current Ibias1 to the circuit branch 58, which includes in series the diode 60 and the resistor Rdac. The voltage Vbandt may be developed at a node 64. The voltage Vbe3 of the diode 60 has a negative temperature coefficient and the resistor Rdac has a positive temperature coefficient but not as large as that of Vbe3 in absolute value. The voltage across Rdac may be PTAT-like. However, the Rdac value and the basic current Iunit may be chosen such that the voltage Vbandt still behaves as a node with negative temp coefficient. At a certain higher values of the resistor Rdac or the current Ibias1, the voltage Vbandt would have a positive temperature coefficient, which should be avoided. Thus, the total temperature coefficient for Vbandt is still negative since Vbe dominates. When the two voltages Vbandt and Vref1 reach the same level (the crossing point), the comparator 22 trips, indicating that the threshold circuit temperature has been reached. As,will be described hereinafter, the threshold circuit temperature may be programmed by adjusting the adjustable current Ibias1 (and therefore by adjusting the voltage Vbandt).

Figure 4:
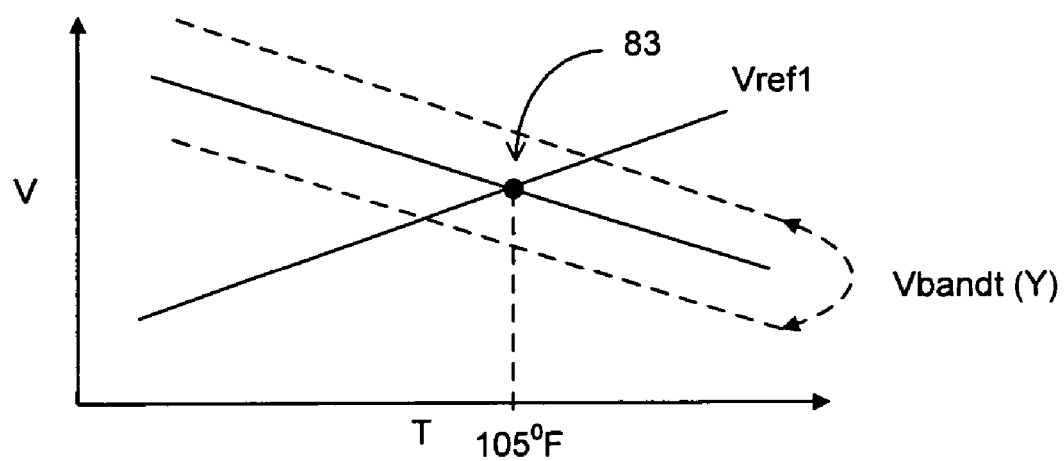
FIG. 4 illustrates a plot of a variable voltage Vbandt(Y) versus a voltage Vref, which shows a substantially linear relationship between them when Y is varied, in accordance with one embodiment of the present invention.

FIG. 4 illustrates how the temperature-measuring voltage Vbandt shifts up and down in a substantially linear manner as a function of an adjustable current Ibias1 from the current sources circuit 16 of FIG. 2. With reference to FIGS. 2 and 4, where the reference voltage Vref1 intersects the temperature measuring voltage Vbandt (a crossing point), a predetermined current threshold temperature is reached and the comparator 22 generates a trip signal. For example, in FIG. 4, one crossing point 83 is shown, which correlates with a predetermined current threshold temperature of 105 degrees Fahrenheit. By varying the adjustable current Ibias1 as a function of an adjustable number Y of unit current sources 30a-30g, the temperature-indicating voltage Vbandt (Y) moves in a substantially linear manner up or down, generating different crossing points (two others shown in FIG. 4) and causing the comparator 22 to generate trip signals at different predetermined threshold circuit temperatures. Referring back to FIG. 2, in the second embodiment, the comparator 68 may be included for a second crossing point and similar results may be obtained by comparing voltages Vbandc and Vref2.

The adjustable current Ibias1 may be "programmable"; hence, the temperature-indicating voltage Vbandt and its associated current threshold temperature may be programmable. Likewise, the adjustable current Ibias2 may be "programmable"; hence, the temperature-indicating voltage Vbandc and its associated current threshold temperature may be programmable. More specifically, both of the voltages Vbandt and Vbandc may be adjusted by use of codewords loaded into the registers 36 and 38, respectively, as will be described hereinafter. Hence, two different predetermined threshold circuit temperatures (and therefore trip point signals) may be controlled independently. Additional crossing points (and therefore trip signals correlating with other threshold circuit temperatures) may be developed by including additional circuit branches with additional current sources enabled by an additional register. In the single trip point signal embodiment just having the register 36, multiple codewords may be inputted into the register 36 to provide a series of programmed threshold circuit temperatures appropriate for controlling the temperature of a given integrated circuit during a period of changing circuit temperatures. Or conversely, many tap points or many Rvref resistors could be used, so that with a fixed register values (same in both registers 36 and 38), various trip points could be generated, as previously described.

Like the biasing of the circuit branch 42 having the voltage Vband, the biasing of the additional circuit branches 58 and 62 having the voltage Vbandt and Vbandc, respectively, may use the same Vbias voltage generated by the bias circuit 18. Since the voltage Vbias is the variable that the band-gap delta-Vbe loop changes in order to compensate for variations on GBNwell, PMOS current sources and diodes of the bias circuit 18, it also may be used to determine the bias conditions of Vbandt and Vbandc. The use of the voltage Vbias for the temperature sensing circuit 12 may reduce the effects of the mentioned mismatches on the generated voltages caused by the offset voltage Voff, assuming that the amount of variation is common to all devices, which is the case for systematic effects. The voltage Vbandt may be described by the following equations:

$$Vbandt(Y) \approx YI_{unit}R_{dac}(T) + V_{be3}(T) \quad \text{Equation 6}$$

Referring to FIG. 2, the current Ibias1 may flow from a node 69 of the current sources circuit 16 to the circuit branch 58, with the node 69 being coupled to receive current from the current sources 28 and a variable integer number Y of the current sources 30a-30g. The current sources 28 (S unit current sources 28) and the current sources 30a-30g form a bank of current sources in the register 36. When calibrating the thermal sensor 10, the current Ibias1 (and therefore the voltage Vbandt) may be increased from the current provided by the current source 28 (Sx) by enabling selected ones of the current sources 30a-30g. Once enabled, some of the current sources 30a-30g may be disabled to decrease the voltage Vbandt. In one embodiment, each of the current sources 30a-30g is constructed to provide a different level of current. For example, as shown in FIG. 1, in one embodiment the current levels furnished by current sources 30a-30g may be weighted to implement a 64-32-16-8-4-2-1 binary weighting scheme, with there being 64, 32, 16, 8, 4, 2, 1 unit current sources that may be enabled or disabled as a group in the current sources 30a-30g. Other binary weighing schemes may be implemented, including making all of the current sources the same. Likewise, if the register 38 and current sources 32 and 34a-34g are included to define a second trip point signal, then the register 38 may be configured and used in the same manner as register 36 and the current sources 34a-34g may be enabled and disabled in the same manner as current sources 30a-30g.

In one embodiment, the registers 36 and 38 may form part of a digital interface. In this manner, the digital interface may be used to enable/disable the current sources 30a-30g and 34a-34g pursuant to a predetermined calibration sequence to determine which current sources are to be permanently enabled/disabled to achieve the desired voltage levels for the temperature-indicating voltages Vbandt and Vbandc. In one embodiment, the registers 36 and 38 each may contain a codeword of seven bits, which may lead to codewords extending from 0 to 128. Each of the bits of the codeword may be uniquely coupled to one of the groups of unit current sources 30a-30g and may be used to selectably enable (when the output is low) and disable (when the output is high) that group of unit current sources 30a-30g. More specifically, one of the bits of the codeword may be coupled to the gates of the P2 transistors of the unit current sources of one of the groups of current sources 30a-30g. In the embodiment of FIG. 2, the bits may be coupled in a hierarchical fashion so that the more significant bits may be coupled to the current sources 30a-30g that supply more current.

Letting previously-described integer Y represent the number of unit current sources of the current sources 30a-30g that are enabled, then with a 7-bit codeword, the integer Y (the codeword) may range from 0 to 128. In one embodiment, the gain of the slope transfer function of the voltage Vbandt may be dependent on the integer number Y of unit current sources 30a-30g that are enabled. Thus, due to the above-described arrangement, the current sources of each of the registers 36 and 38 collectively function as a digital-to-analog (D/A) converter (DAC) by converting the values of the programmable bits of the codewords in the registers 36 and 38 into analog output currents that are combined at the node 69 to form the adjustable current Ibias1 and at the node 70 to form the adjustable current Ibias2. As a result, each time the value of one of the bits changes by one, the level of the current Ibias1 or Ibias2 changes by a predetermined amount. The interface also may include data and control lines (not shown) coupled to the registers 36 and 38. When implemented in a processor, data may be loaded into and retrieved from the registers 36 via a serial scan chain arrangement (not shown). In other embodiments, the registers 36 and 38 may contain more or less bits than seven.

The gain of the voltage Vbandt directly determines the gain of the slope transfer function and is proportional to the DAC-controlled portion of the adjustment current Ibias1 (current sources 30a-30g) being delivered to the branch 58 and the resistance Rdac. With respect to the circuit branch 58 generating the voltage Vbandt, in order to ensure a linear stepping in the voltage Vbandt as the current changes with the DAC settings of the register 36, the series diode 60 may be fully biased for all DAC possible inputs. By shifting Vbandt up and down, a superior linearity may be achieved, meeting a +/−2.5° C. accuracy specification for a digital thermometer across the 30° C. to 105° C. range for a processor core, for example.

For the thermal sensor 10 of FIG. 2, according to one embodiment of the present invention, the slope error may be less than 1.6%, which in principle may not require any further compensation. However, in preparation for larger slope variation, an additional linearity compensation scheme may be included for slope compensation in the thermal sensor 10 of FIG. 5, according to another embodiment of the present invention. In general, the linearity compensation scheme may correct for the shifts on the ideal transfer slope caused by systematic and random process variations. In order to implement this embodiment, two trim temperature points may be used during manufacturing.

Figure 5:
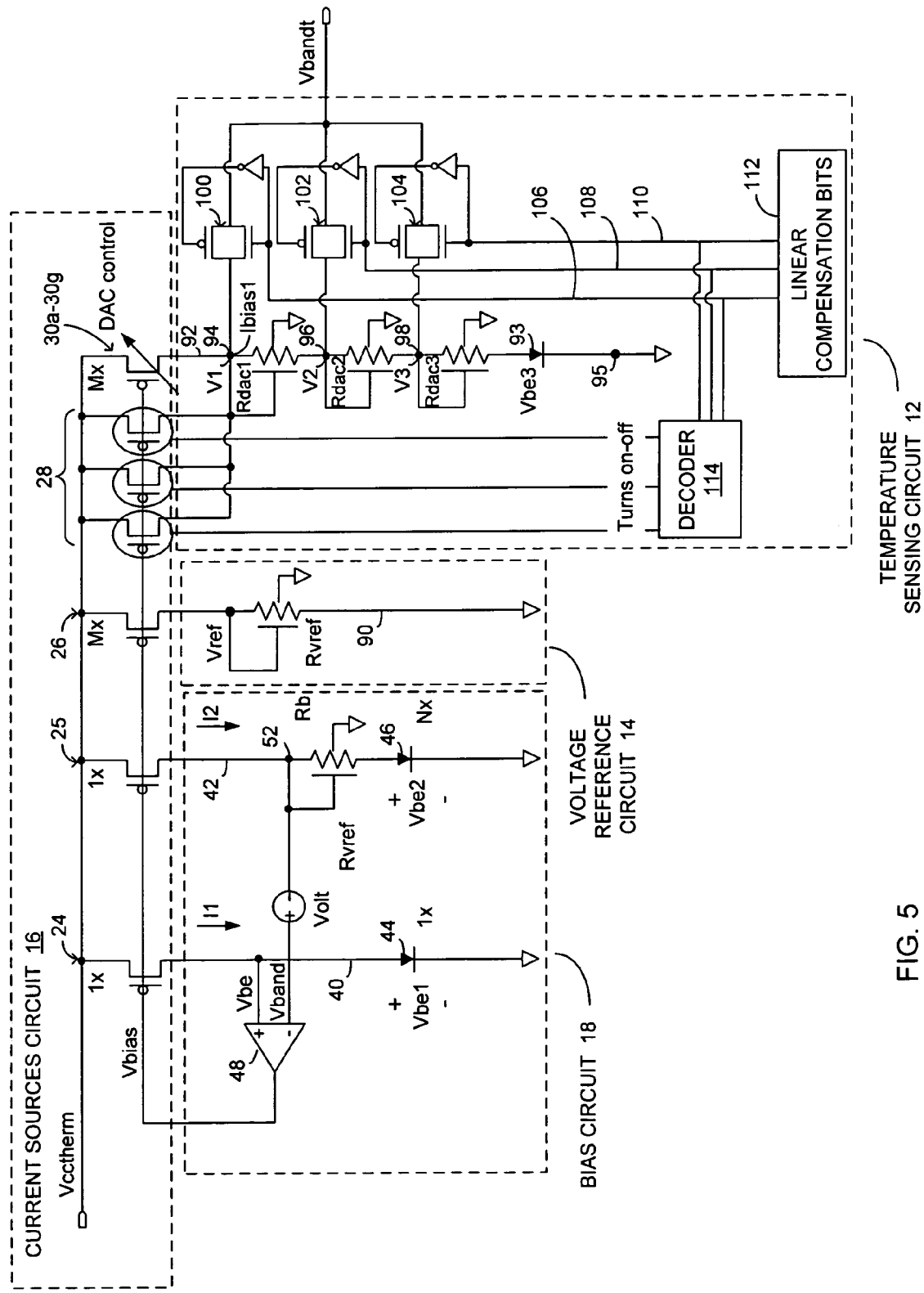
FIG. 5 illustrates a detailed circuit schematic of the thermal sensor of FIG. 1 according to another embodiment of the present invention.

Referring to FIG. 5, the thermal sensor 10 of FIG. 1 is shown implemented in another embodiment according to the present invention. The bias circuit 18 may be the same as shown in FIG. 2; hence, the same reference numbers are retained and the bias circuit 18 will not be described again. Likewise, the current sources circuit 16 may include the current sources 24, 25, 26, 28 and 30a-30g (these DAC controlled current sources are illustrated by a single current source) as shown in the embodiment of FIG. 2 and retain the same reference numbers. Only the transistors P1 and not the transistors P2 are shown in FIG. 5 so as to simplify the Figure. The reference voltage circuit 14 essentially is the same as the embodiment of FIG. 2, except a circuit branch 90 is shown with only one resistor Rverf; hence, there is only one reference voltage Vref generated.

Instead of one resistor Rdac as in FIG. 2, the temperature sensing circuit 12 of FIG. 5 may include a branch 92 with three resistors Rdac1, Rdac2, and Rdac3 and a diode 93 (with forward bias voltage Vbe3) coupled in series between a beginning node 94 and an ending node 95, with the ending node 95 being coupled to a ground. The node 94 may receive an adjustable current Ibias1 from the current sources 28 and 30a-30g. A voltage V1 is shown at the a voltage node 94, a voltage V2 is shown at a voltage node 96 and a voltage V3 is shown at a voltage node 98. Pass gates 100, 102, and 104 may be coupled to the nodes 94, 96, and 98, respectively. The pass gates 100, 102 and 104 may be coupled by lines 106, 108, and 110, respectively, to a register 112, which may contain linear compensation bits.

In one embodiment, there may be one linear compensation bit for enabling/disabling each of the pass gates 100-104. The linear compensation bits of the register 112 also may be coupled to a binary decoder 114, which may be used to turn on and off the current sources 28 which are coupled to the node 94. Although only three unit current sources 28 are illustrated in FIG. 5 for the purposes of simplicity, in one embodiment, there may be seven unit current sources 28 that are controllable by decoder 114. In one embodiment, additional current sources 28 (not shown) may always be on (fixed) to ensure the correct biasing of diode 93. For example, the current sources 28 may include a fixed number Sx of unit source currents 28 as shown in FIG. 2, in addition to the unit current sources 28 controlled by the decoder 114.

Since the embodiment illustrated in FIG. 5 is illustrated with three current sources 28 being controllable by the binary decoder 114, there may be three compensation settings generated by the binary decoder 114, with one setting leaving two current sources 28 on, one setting turning on an additional current source 28 for a total of three being on, and one setting turning off one of the current source 28 so only one current source 28 is on. In general, in this embodiment, the current from the current sources 28 may also be adjustable in a similar manner to the current sources 30a-30g being adjustable. Although only three current sources, three resistors Rdac1-3, three voltage levels V1-V3, three pass gates 100-104, three lines 106-110 are illustrated in the embodiment of FIG. 5, in some embodiments, there may be more of each, such as seven of each.

As with the embodiment of FIG. 2, the gain of the slope transfer function of the temperature-indicating voltage Vbandt in the embodiment of FIG. 5 may be proportional to the DAC-controlled portion of the adjustment current Ibias1 (current sources 30a-30g) being delivered to the branch 58, which is a function of the integer Y (number of enabled unit currents sources 30a-30g). However, in the embodiment of FIG. 5, the gain is also made proportional to a segmented resistance Rdac. More specifically, in the embodiment of FIG. 5, in order to modify the gain factor, the resistance Rdac may be subdivided into three resistors Rdac1, Rdac2, and Rdac3, which are in series and may be collectively referred to as the resistance "Rdac". Likewise, the voltage Vbandt may have three levels: a first voltage level V1 with the pass gate 100 enabled and the pass gates 102 and 104 disabled; a second voltage level V2 with the pass gate 102 enabled and the pass gates 100 and 104 disabled; and a third voltage level V3 with the pass gate 104 enabled and the pass gates 100 and 102 disabled. The voltage V1 is equal to Iadj1(Rdac1+Rdac2+Rdac3); voltage V2 is equal to Iadj1(Rdac2+Rdac3) and voltage V3 is equal to Iadj1(Rdac3). Thus, the segmented resistance Rdac may be arranged so that there is a selectable number of discrete resistors Rdac1-3 coupled in series between the selectable voltage node 94, 96, or 98 at which the temperature-indicating signal is obtained and the ending node 95 coupled to the ground, with a selected number of the resistors Rdac1-3 being included between a selected one of the voltage node 94, 96, or 98 and ground, so as to provide the temperature-indicating signal Vbandt in the form of one of the selectable voltages V1, V2 or V3. The selectability of these components may be determined by the linear compensation bits.

The above described transfer slope gain is true if the series diode 93 is fully biased even for the lowest possible value of Ibias1, which would be the current from the current sources 28 and no current from the current sources 30a-30g (Y=0). In one embodiment, when the resistance Rdac is adjusted to be at its lowest value, the bias component of the voltage Vbandt may be kept at about the same voltage level as existed before the readjustment of the resistance Rdac by the additional adjustment of the current Ibias1 by a similar amount. To accomplish this current adjustment, the decoder 114 correspondingly enables and disables (turns on and off) the current sources 28 in response to the linear compensation bits from the register 112. This ensures that regardless of the slope adjustment, both the initial and final slope transfer function will intersect for Y=0, which is the lowest setting of the control register 36 that controls the current sources 30a to 30g (all 30a-g are off). This will be explained in more detail hereinafter with respect to FIG. 6.

Figure 6:
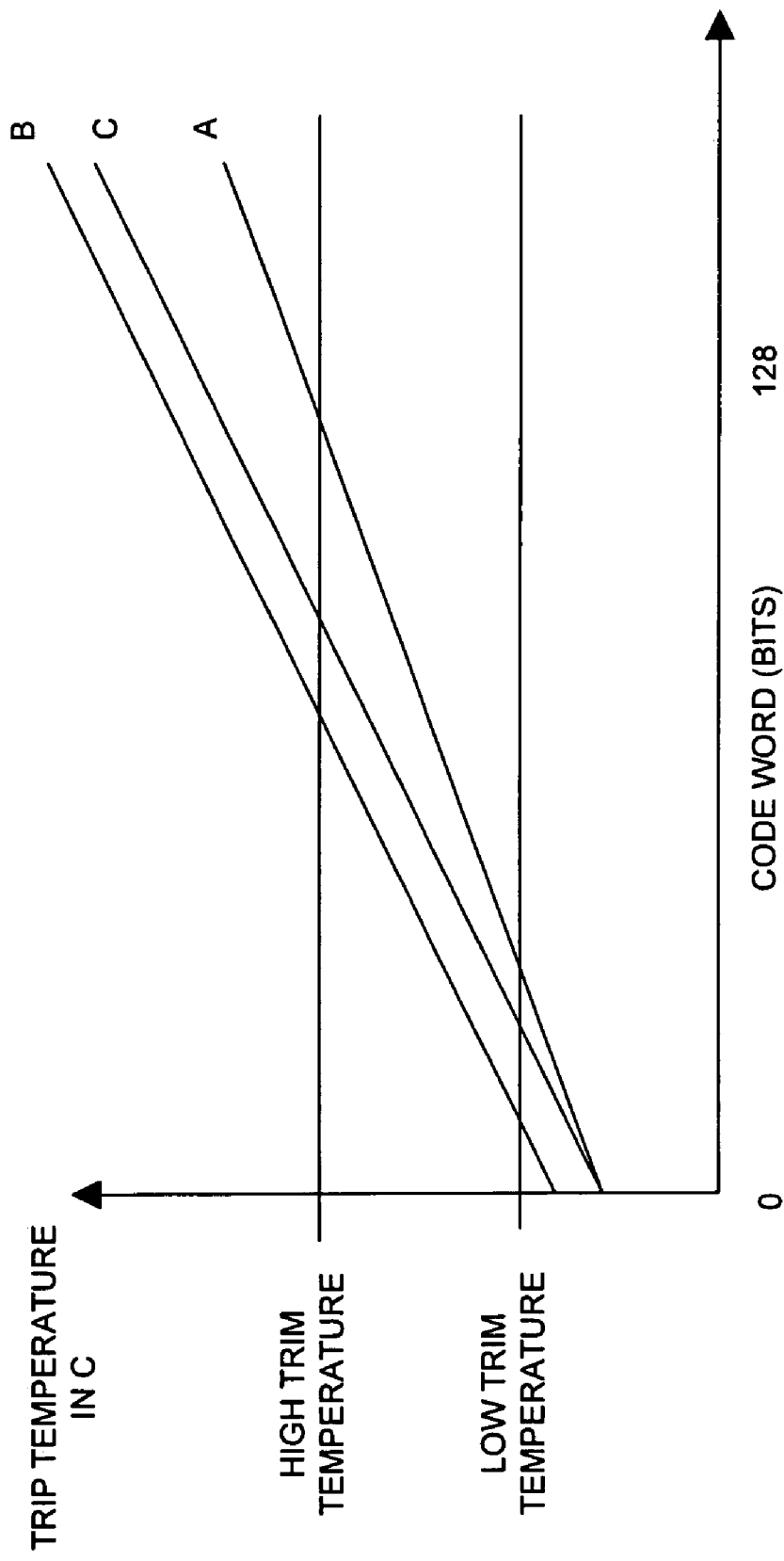
FIG. 6 illustrates a graph of trip temperature versus codewords, showing a method of modifying a slope of the transfer function of Vbandt in the embodiment of FIG. 5.

Referring to FIG. 6, there is illustrated a graph of the trip circuit temperature ("trip temperature") versus codeword. As previously described, in one embodiment, the codewords may be expressed in bits and may extend from 0 to 128. As previously described, the codewords may be the integer number Y of the current sources 30a-30g that are turned on. Each of the plots A, B, and C may be characterized as a "slope transfer function", which may be substantially a linear transfer function and may be referred to as "trip temperature transfer function". Referring back to FIG. 4, it should be noted that trip temperatures were also a direct function of the temperature-indicating voltage Vbandt(Y). Therefore, the temperature-indicating voltage Vbandt(Y) may be substituted on the vertical axis in FIG. 6 for the trip temperature so that the illustrate slope transfer functions for the trip temperature may also be considered slope transfer functions for the voltage Vbandt. Hence, adjusting the slope of the transfer function of trip temperature versus codeword may also be considered as adjusting the slope of the transfer function of voltage Vbandt versus codeword.

Referring to FIG. 6, an adjustment of the slope of the slope transfer function for the thermal sensor 10 of FIG. 5 is illustrated by a simple example. A high and low trim temperature is shown, which will be used for determining the slope of the slope transfer function. Plot A is a plot of the slope transfer function, which has a lower than expected slope. A plot B shows the slope transfer function after increasing only the value of the resistance Rdac, with the function having a higher slope, but without the plots A and B intersecting at the codeword 0. A plot C shows the slope transfer function with the higher slope caused by increasing the value of the resistance Rdac (as was done with plot B). But plot C also has a lower y-intercept due to decreasing the current generated by the current sources 28. Now the plot A and the plot C intersect at codeword 0, which is a desired result. A more detailed explanation of the operation of the thermal sensor 10 of FIG. 5 will now be provided.

Figure 7:
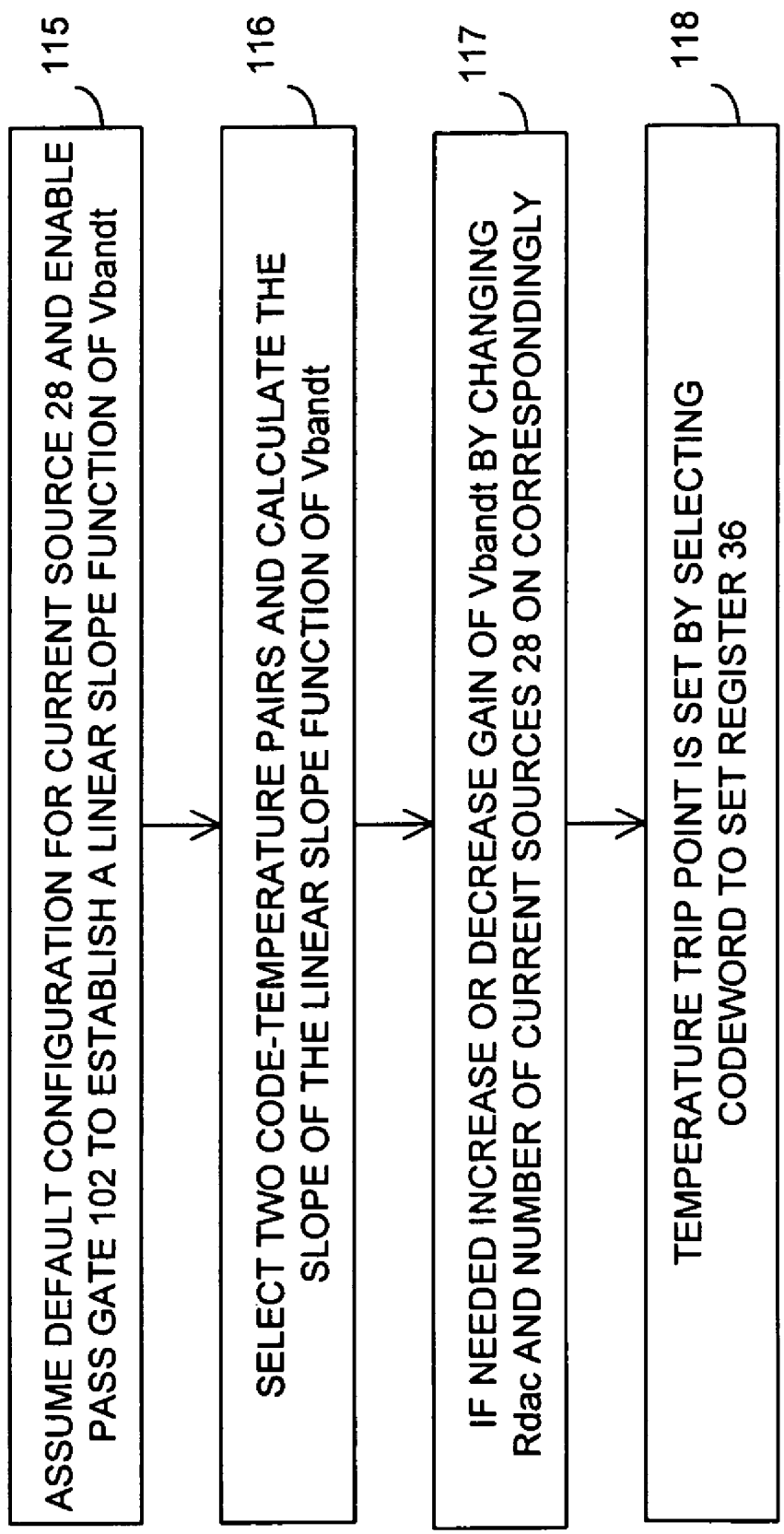
FIG. 7 illustrates a flow chart of a method of modifying a slope of the transfer function of Vbandt in the embodiment of FIG. 5.

Referring to FIG. 7, a flow chart of the operation of the thermal sensor 10 of FIG. 5, in accordance with some embodiments is shown. Referring to FIGS. 5, 6 and 7, as previously mentioned, one current source 28 of FIG. 5 may be set to always be on. In an operation 115 of FIG. 7, a default configuration is assumed wherein half of the controllable current sources 28 may be on and the other half may be off. Additionally, the pass gate 102 is enabled, so that voltage Vbandt equals the intermediate voltage V2.

In an operation 116, the slope of the slope transfer function of the trip temperature versus codeword may be verified to determine if it is too low or too high. To accomplish this verification, two code-temperature pairs may be selected. Each code-temperature pair may include a trip temperature and corresponding codeword, with the pair forming a point on the slope transfer function. For example, where the high and low trim temperature lines in FIG. 6 intersect the slope transfer function, such as plot A, two code-temperature pairs are selected, which will be referred to as (Temp1, Code1) and (Temp 2, Code 2). By ascertaining these two pairs, the slope can be extracted as:

$$m=(Temp2-Temp1)/(Code2-Code1).$$

Then, depending on how far the slope is from a desired target slope (e.g. 1 C/bit, where C is centigrade), the linear compensation bits of the register 112 may be chosen to raise or decrease the slope. In one embodiment, 7 settings for the register 112 may increase the slope by −12%, −8% −4%, 0, 4%, 8% and 12%. However, in FIG. 6, settings for only one slope increase and one slope decrease are shown for the purpose of simplicity.

In an operation 117 of FIG. 7, if needed, the slope of the slope transfer function may be increased or decreased, e.g., by selecting voltage V1 or V3, respectively, to be the voltage Vbandt. As with the illustrative example of FIG. 6, if the gain of the voltage Vbandt needs to be increased, the resistance Rdac is increased to include Rdacs 1-3 by enabling the pass gate 100 and voltage Vbandt becomes voltage V1. Then, at the same time, to keep the voltage Vbandt at the same bias point (the level when the current sources 30a-g are all off), one of the current sources 28 is turned off, since the voltage is V=(I)(R) and if resistance Rdac goes up, current Ibias1 must go down to maintain the voltage Vbandt (at Y=0) constant. If the gain of the voltage Vbandt needs to go down, the opposite happens. In a seven settings embodiment, there may be the previously described default configuration and three up and three down settings that work as previously described.

In an operation 118 of FIG. 7, once a desired slope transfer function with a given gain for the voltage Vbandt is selected, a temperature trip point is set by selecting a codeword for the register 36, therefore turning on Y number of the current sources 30a-30g. The above operations are undertaken during manufacturing. It should be noted that only changes in the resistance Rdac changes the gain, since the current Ibias1 variation range between codeword 0 and codeword 128 is the same before and after compensation. In other words, changes in the resistance Rdac and the current sources 28 may be coupled and may be determined simultaneously, with the resistance Rdac being changed by enabling a different pass gate (pass gate 100 or pass gate 104 instead of pass gate 102). This sets the gain and setting the codeword for register 36 will not change the gain, but will set a trip point for a predetermined threshold circuit temperature.

In one embodiment, the first trim temperature point may then be used to figure out the new trim value needed for the voltage Vbandt after compensation. This may limit the number of trim operations to two, instead of possible three (one more needed to verify the trim of the compensated part). More specifically, by keeping the Y=0 level constant, this may allow for not having to verify the trim after the slope adjustment, because the original slope is known, the amount of correction is known, and the old and new slopes intersect for Y=0. Without this feature, each part may have to be trimmed again after slope correction. This additional trim may introduce significant delay during high volume manufacturing. After compensation for the problematic skew corners by applying the compensation scheme of FIG. 5, the resulting transfer slopes may be more tightly grouped to the design target.

Figure 8:
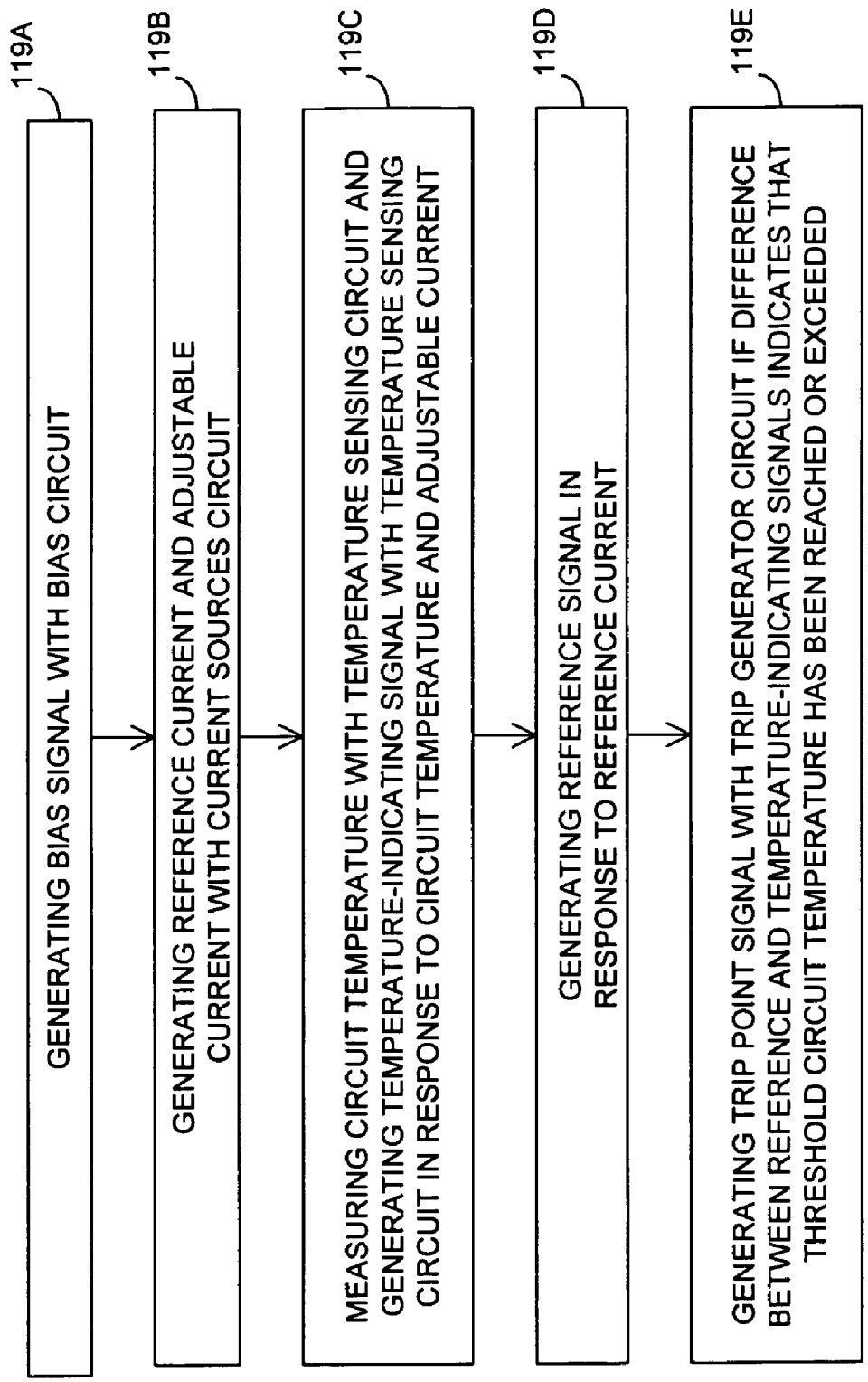
FIG. 8 illustrates a flow chart of a method of operating the thermal sensor of FIG. 1, according one embodiment of the present invention.

Referring to FIG. 8, the operation of the thermal sensor 10 of FIGS. 2 and 5 including the following method, according to one embodiment of the present invention. At 119A, the method includes generating a bias signal with a bias circuit. The generating of the bias signal with the bias circuit includes generating a first voltage at a first node with a first circuit branch having the first node and a first diode in series; generating a second voltage at a second node with a second circuit branch having the second node, a first branch resistor, and a second diode in series; and comparing the first voltage and the second voltage with a comparator so as to generate the bias signal.

At 119B, the method includes generating a reference current and an adjustable current with a current sources circuit. At 119C, the method includes measuring a circuit temperature with a temperature sensing circuit and generating a temperature-indicating signal with the temperature sensing circuit in response to the circuit temperature and the adjustable current. The generating of the temperature-indicating signal with the temperature sensing circuit includes generating the temperature-indicating signal at a third node of a third circuit branch having the third node, a resistance and a third diode coupled in series to a ground, with the third node receiving the adjustable current.

At 119D, the method includes generating a reference signal in response to the reference current. At 119E, the method includes generating a trip point signal with a trip generator circuit if a difference between the reference and the temperature-indicating signals indicates that a threshold circuit temperature has been reached or exceeded. With respect to 119B, the generating of the adjustable current with the current sources circuit includes adjusting the adjustable current so that the temperature-indicating signal has a given gain to establish the predetermined threshold circuit temperature. Additionally, the generating of the adjustable current with the current sources circuit further includes adjusting the resistance to adjust a slope transfer function of the temperature-indicating signal.

In summary, the thermal sensor 10 of FIG. 2, according to one embodiment of the present invention, may eliminate the intrinsic non-linearity of some prior art thermal sensor designs, with such intrinsic non-linearity being illustrated in FIG. 3. More specifically, the thermal sensor 10 of FIG. 2 may be used to reduce or trim out the offset voltage Voff, if the voltage Voff has negligible temperature dependence. The thermal sensor 10 of FIG. 5 also may provide a capability to trim out slope shifts introduced by process variations. It should be noted that slope trimming or adjusting may use two trim temperatures, with the design of FIG. 5 supporting this due to the codeword (for current sources 30a-30g) for the trip temperature transfer function being substantially linear across the entire operating range. Hence, in the embodiment of FIG. 5, the thermal sensor 10, according to one embodiment of the present invention, may provide a linearity as good as +/−1° C. across the temperature range between 30° C. and 105° C., with built-in capabilities for slope compensation. The linearity compensation scheme may correct shifts on the ideal transfer slope caused by systematic and random process variations. In one embodiment, the design of FIG. 5 may enable the use of the thermal sensor 10 as a digital thermometer on a processor chip. The proposed scheme may achieve the high linearity desired for the digital thermometer. In one embodiment, the thermal sensing circuit 10 may be fabricated on the same die as a processor. In another embodiment, portions of the sensing circuit 10 may be external to the processor.

In general, the design of the thermal sensor 10 of FIG. 2 may provide a good linearity, which may be understood the slope of the slope transfer function being relatively uniform across the temperature range. In other words, the slope (in C/bit) is substantially the same (or 99% the same) at 10 C, 30 C, 50 C, 70 C, 90 C and 110 C. However, the actual slope magnitude may vary from part to part (so if the target is 1 C/bit, there may be parts with 1.05 C/bit or 0.96 C/bit and so on. For a digital thermometer application, the assumption is that the slope is constant across the temperature range (which may be accomplished by the thermal sensor 10 of FIG. 2) and that its magnitude is known (which may be accomplished by the thermal sensor 10 of FIG. 5 by making all parts have the same slope). In another embodiment, the correction to the slope could also be done digitally by the digital thermometer logic, but for this approach to work, the slope still needs to be known.

Figure 9:
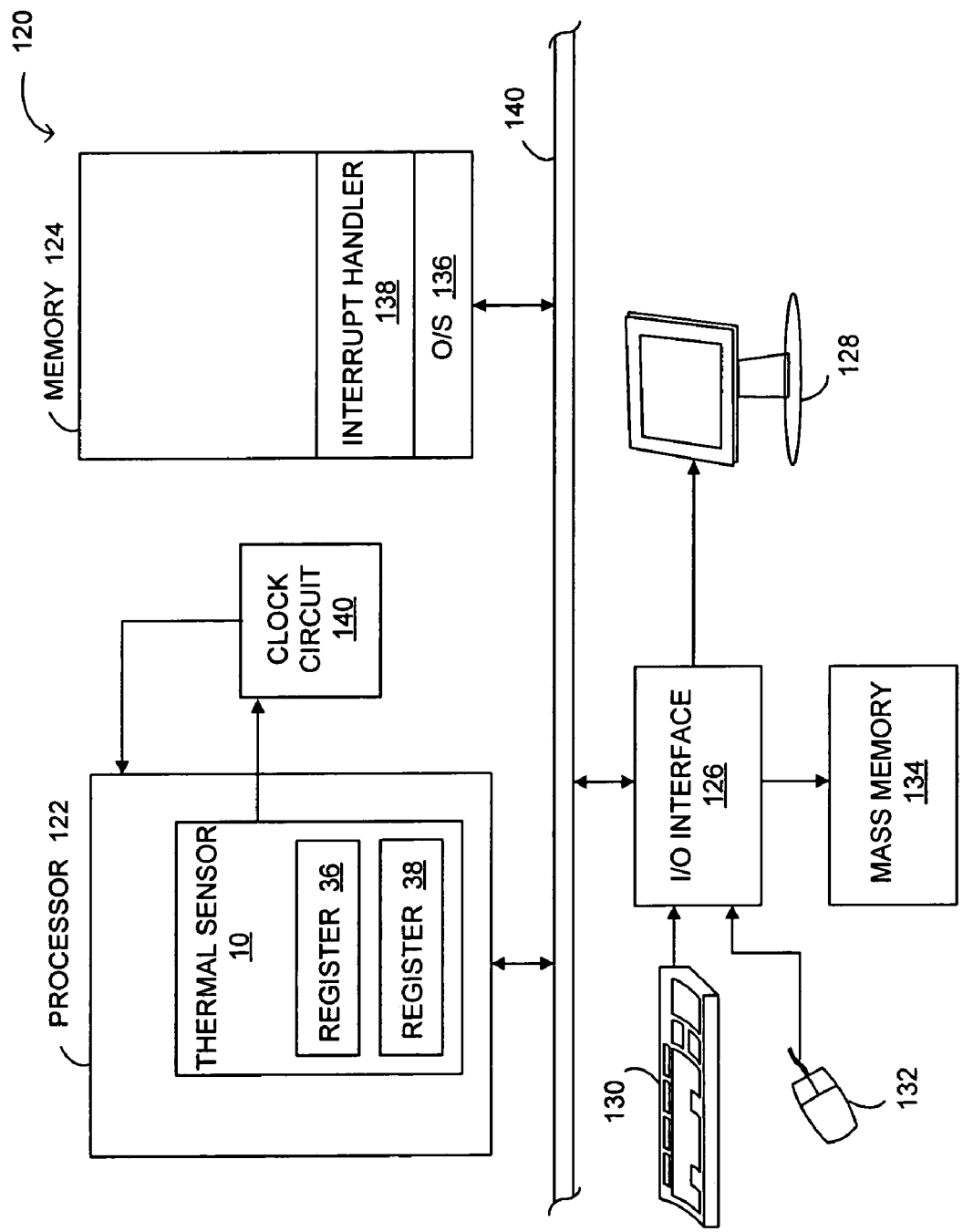
FIG. 9 illustrates a system incorporating the thermal sensor of FIG. 1 according to the various embodiments of the present invention.

Referring to FIG. 9, a computer system 120 incorporating a processor with thermal sensor 10, according to the various embodiments of the present invention. The computer system 120 may contain a processor 122 incorporating or associated with the thermal sensor 10. The computer system 120 also may contain a memory 124 and an input/output (I/O) interface 126. The I/O interface 126 may be coupled to an output display 128 and input devices 130 and 132. In addition, I/O interface 126 may be coupled to a mass memory device 134. The processor 122, memory 124, I/O interface 126, output device 128, and input devices 130 and 132 are those components commonly found in a computer system, and, in fact, the computer system 120 is intended to represent a broad category of data processing devices. The memory 124 may store software for operation of the computer system 120. Specifically, memory 124 may store an operating system (OS) 136 and an interrupt handler routine 138 for operation in conjunction with the thermal sensor 10.

Upon generation of an interrupt (a trip point signal) in the thermal sensor 10, the interrupt handler routine 136 is executed. In general, the interrupt handler routine 136 may generate a message (first trip point signal) to the output display 128. The message informs the user of the computer system 120 that the processor 122 has attained the threshold temperature. In response, a user may alter external environmental conditions to facilitate cooling of the processor 122. Additionally or alternatively, the computer system 120 may respond by causing a clock circuit 140 to reduce the processor's clock frequency. The processor 122 may set a new, higher threshold circuit temperature for the thermal sensor 10 by replacing the codeword in register 36 or by using the register 38, as described in FIG. 2. If the processor 122 temperature rises to the new critical threshold circuit temperature, another interrupt (second trip point signal) may be generated. Again, the interrupt handler routine 136 may be called upon to generate a message to the user on output display 128. If the temperature reaches a critical temperature for which the thermal sensor 10 may be programmed, then the thermal sensor 10 may generate an interrupt to shut down the processor 122.

Codewords for the threshold circuit temperatures may be programmed via the registers 36 and 38, which may be accessed through a system bus 140. The system bus 140 may include a clock line and a data line that may used to store codewords from the thermal sensor 10. When a threshold circuit temperature is exceeded, the thermal sensor 10 may assert a trip point signal over another line in the system bus 140 to alert the computer system 120 that corrective action is needed.

In some embodiments, by taking advantage of the relatively high linearity of the thermal sensor 10, a relatively accurate thermometer may be built by allowing a digital logic block to control the contents of register 36. The contents of this register may start at zero and may increase by one at a given interval. At the same time, the logic block may monitor the trip point signal for a change in its state. When this occurs, the content in register 36 may be correlated to the current circuit temperature of the processor. For a continuous monitoring of the circuit temperature, there may be various approaches: the above described sequence may be repeated continuously or the register value may be decreased by 1 in order to cause a return to the previous state of trip point signal. This way, register 36 oscillates around the correct setting and will actively 'hunt' for the processor circuit temperature as it changes in response to the varying operating conditions. This 'real-time' temperature reading may be used for finer temperature management policies, including fan control.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus comprising:
   a current sources circuit configured to generate a reference current and an adjustable current;
   a temperature sensing circuit coupled to the current sources circuit, the temperature sensing circuit configured to measure a circuit temperature and to generate a temperature-indicating signal in response to the circuit temperature and the adjustable current;
   a reference voltage circuit coupled the current sources circuit and configured to provide a reference signal in response to the reference current;
   a trip generator circuit coupled to the temperature sensing circuit and the reference voltage circuit and configured to generate a trip point signal if a difference between the reference and the temperature-indicating signals indicates that a threshold circuit temperature has been reached or exceeded; and
   a bias circuit coupled to the current sources circuit and configured to generate a bias signal, the bias circuit including a first circuit branch having a first node and a first diode in series, and a second circuit branch having a second node, a first branch resistor, and a second diode in series, the bias circuit and the current sources circuit forming a band-gap delta-Vbe loop including a bias generating comparator, and the bias generating comparator including a first input terminal coupled to the first node and a second input terminal coupled to the second node.

2. The apparatus according to claim 1, wherein the apparatus includes the current sources circuit; the current sources circuit includes a register containing a plurality of values of programmable inputs; and the current sources circuit is configured to generate the adjustable current in part based upon the values of the programmable inputs.

3. The apparatus according to claim 2, wherein the current sources circuit further includes a plurality of binary weighted current sources coupled to the register, with the plurality of binary weighted current sources being configured to be enabled or disabled in response to the values of the programmable inputs.

4. The apparatus according to claim 1, wherein
   the temperature sensing circuit includes a first circuit branch having a first node, a first resistor and a diode in series, with the first node being coupled to the current sources circuit to receive the adjustable current; and
   the reference voltage circuit includes a second circuit branch having a second node and a second resistor, with the second node being coupled to the current sources circuit to receive the reference current.

5. The apparatus according to claim 4, wherein the trip generator circuit includes a trip comparator having a first input terminal coupled to the first node; a second input terminal coupled to the second node; and an output terminal having the trip point signal.

6. The apparatus according to claim 1, wherein
   the temperature sensing circuit includes a third circuit branch having a third node, and a third branch resistor and a third diode in series, with the third node being coupled to the current sources circuit to receive the adjustable current;
   the reference voltage circuit includes a fourth circuit branch having a fourth node and a fourth branch resistor, with the fourth node being coupled to the current sources circuit to receive the reference current; and
   the trip generator circuit includes a trip comparator having a third input terminal coupled to the third node; a fourth input terminal coupled to the fourth node; and an output terminal having the trip point signal.

7. The apparatus according to claim 1, wherein the trip generator circuit includes at least one trip comparator coupled to the reference voltage circuit and the temperature sensing circuit and configured to generate the trip point signal in response to the reference signal being substantially equal to or greater than the temperature-indicating signal.

8. The apparatus according to claim 1, wherein
the current sources circuit is configured to generate at least two adjustable currents;
the temperature sensing circuit is configured to generate at least two temperature-indicating signals in response to at least two circuit temperatures and the at least two adjustable currents;
the reference voltage circuit is configured to provide at least two reference signal in response the reference current; and
the trip generator circuit is configured to generate the trip point signal if a difference between the reference signal and one of the at least two temperature-indicating signals indicates that one of the at least two threshold circuit temperatures has been reached or exceeded.

9. An apparatus comprising:
a temperature sensing circuit coupled to a current sources circuit configured to generate a reference current and an adjustable current, the temperature sensing circuit configured to measure a circuit temperature and to generate a temperature-indicating signal in response to the circuit temperature and the adjustable current;
a reference voltage circuit coupled the current sources circuit and configured to provide a reference signal in response to the reference current; and
a trip generator circuit coupled to the temperature sensing circuit and the reference voltage circuit and configured to generate a trip point signal if a difference between the reference and the temperature-indicating signals indicates that a threshold circuit temperature has been reduced or exceeded;
wherein the temperature sensing circuit includes a circuit branch having a beginning node, an ending node, and a plurality of resistors and a diode coupled in series between the beginning node and the ending node; the beginning node is coupled to the current sources circuit to receive the adjustable current; and the temperature-indicating signal is a function of a selected number of the resistors and the adjustable current.

10. The apparatus according to claim 9, wherein the ending node is coupled to a ground; the circuit branch further includes a plurality of voltage nodes with adjacent voltage nodes being separated by one of the resistors; the temperature-indicating signal is accessed at a selected one of the voltage nodes; the selected number of resistors are coupled between the selected one of the voltage nodes and the ground.

11. The apparatus according to claim 10, further comprising a register containing a plurality of linear compensation bits; a plurality of pass gates coupled to the register and configured to select the selected one of the voltage nodes in response to the plurality of linear compensation bits; and a decoder coupled to the register and the current sources circuit and configured to adjust the adjustable current in response to the plurality of linear compensation bits.

12. The apparatus according to claim 11, wherein the current sources circuit includes a plurality of current sources configured to be enabled or disabled by the decoder in response to the plurality of linear compensation bits.

13. A method comprising:
measuring a circuit temperature with a temperature sensing circuit, with a current sources circuit configured to generate a reference current and an adjustable current;
generating a temperature-indicating signal with the temperature sensing circuit in response to the circuit temperature and the adjustable current;
generating a reference signaling response to the reference current;
generating a trip point signal with a trip generator circuit if a difference between the reference and the temperature-indicating signals indicates that a threshold circuit temperature has been reached or exceeded;
generating the reference and adjustable currents with the current sources; and
generating a bias signal with a bias circuit, including:
generating a first voltage at a first node of the bias circuit with a first circuit branch of the bias circuit having the first node and a first diode in series;
generating a second voltage at a second node of the bias circuit with a second circuit branch of the bias circuit having the second node, a first branch resistor, and a second diode in series; and
comparing the first voltage and the second voltage with a comparator of the bias circuit so as to generate the bias signal.

14. The method according to claim 13, wherein
the generating of the temperature-indicating signal with the temperature sensing circuit includes generating the temperature-indicating signal at a node of a circuit branch of the temperature sensing circuit having the node, a resistance and a diode coupled in series to a ground, with the node receiving the adjustable current; and
the method includes generating the adjustable current with the current sources circuit including adjusting the adjustable current so that the temperature-indicating signal establishes the predetermined threshold circuit temperature.

15. The method according to claim 14, wherein the generating of the adjustable current with the current sources circuit further includes adjusting the resistance to adjust a slope transfer function of the temperature-indicating signal.

16. A method comprising:
passing an adjustable current through a circuit branch of a temperature sensing circuit having a plurality of resistors and a diode coupled in series and a plurality of voltage nodes with adjacent voltage nodes separated by one of the resistors;
selecting one of the voltage nodes to obtain a temperature-indicating signal;
adjusting a slope of a transfer function by selecting another one of the voltage nodes to obtain a temperature-indicating signal and correspondingly adjusting the adjustable current; and
prior to selecting one of the voltage nodes to obtain the temperature-indicating signal, determining the slope by selecting a pair of points from the transfer function and calculating the slope from the pair of points.

17. The method according to claim 16, further comprising:
adjusting the adjustable current so that the temperature-indicating signal establishes a predetermined threshold circuit temperature.

18. A system comprising:
a processor;
a thermal sensor coupled the processor, the thermal sensor including:
a bias circuit configured to provide a bias signal, the bias circuit including a first circuit branch having a first node and a first diode in series, and a second circuit branch having a second node, a first branch resistor, and a second diode in series;
a current sources circuit coupled to the bias circuit and configured to generate a reference current and an adjustable current, the bias circuit and the current sources circuit forming a band-gap delta-Vbe loop including a bias generating comparator, the bias generating comparator includes a first input terminal coupled to the first node and a second input terminal coupled to the second node;

a temperature sensing circuit coupled to the current sources circuit and configured to measure a circuit temperature and to generate a temperature-indicating signaling response to the circuit temperature and the adjustable current;

a reference voltage circuit coupled the current sources circuit and configured to provide a reference signaling response to the reference current; and a trip generator circuit coupled to the temperature sensing circuit and the reference voltage circuit and configured red to generate an interrupt signal if a difference between the reference and the temperature-indicating signals indicates that a threshold circuit temperature has been reached or exceeded;

a mass memory device; and a bus coupled to the processor and the mass storage device.

19. The system according to claim 18, wherein the current sources circuit includes a register containing a plurality of values of programmable inputs; and the current sources circuit is configured to generate the adjustable current in part based upon the values of the programmable inputs.

20. The system according to claim 18, wherein the temperature sensing circuit includes a circuit branch having a node, an adjustable resistor and a diode in series, with the first node being coupled to the current sources circuit to receive the adjustable current and the temperature-indicating signal being a function of the adjustable resistor and the adjustable current.

21. The system according to claim 18, wherein
the temperature sensing circuit includes a third circuit branch having a third node, and a third branch resistor and a third diode in series, with the third node being coupled to the current sources circuit to receive the adjustable current;

the reference voltage circuit includes a fourth circuit branch having a fourth node and a fourth branch resistor, with the fourth node being coupled to the current sources circuit to receive the reference current; and the trip generator circuit includes a trip comparator having a third input terminal coupled to the third node; a fourth input terminal coupled to the fourth node; and an output terminal having the trip point signal.

22. The system according to claim 18, wherein the temperature sensing circuit includes a circuit branch having a beginning node, an ending node, and a plurality of resistors and a diode coupled in series between the beginning node and the ending node; the beginning node is coupled to the current sources circuit to receive the adjustable current; and the temperature-indicating signal is a function of a selected number of the resistors and the adjustable current.

23. The system according to claim 22, wherein the ending node is coupled to a ground; the circuit branch further includes a plurality of voltage nodes with adjacent voltage nodes being separated by one of the resistors; the temperature-indicating signal is accessed at a selected one of the voltage nodes; the selected number of resistors are coupled between the selected one of the voltage nodes and the ground.

24. The system according to claim 23, further comprising a register containing a plurality of linear compensation bits; a plurality of pass gates coupled to the register and configured to select the selected one of the voltage nodes in response to the plurality of linear compensation bits; and a decoder coupled to the register and the current sources circuit and configured to adjust the adjustable current in response to the plurality of linear compensation bits.

25. The system according to claim 24, wherein the current sources circuit includes a plurality of current sources configured to be enabled or disabled by the decoder in response to the plurality of linear compensation bits.

* * * * *

UNITED STATES PATENT AND TRADEMARK OFFICE
CERTIFICATE OF CORRECTION

| | | |
|---|---|---|
| PATENT NO. | : 7,565,258 B2 | Page 1 of 1 |
| APPLICATION NO. | : 11/369746 | |
| DATED | : July 21, 2009 | |
| INVENTOR(S) | : David E. Duarte | |

Figure 2A:
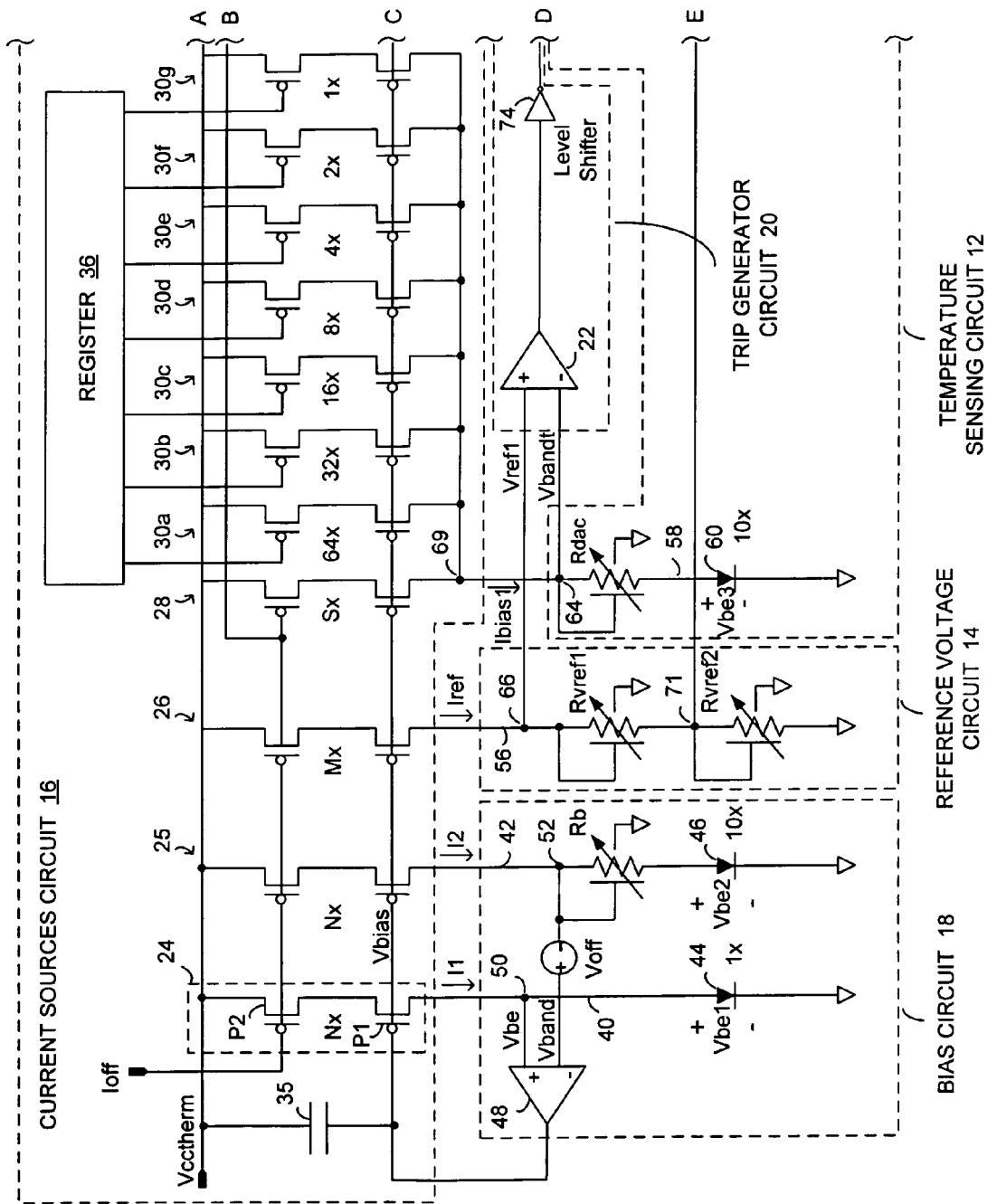
FIG. 2 illustrates a detailed circuit schematic of the thermal sensor of FIG. 1 according to one embodiment of the present invention.
Figure 2B:
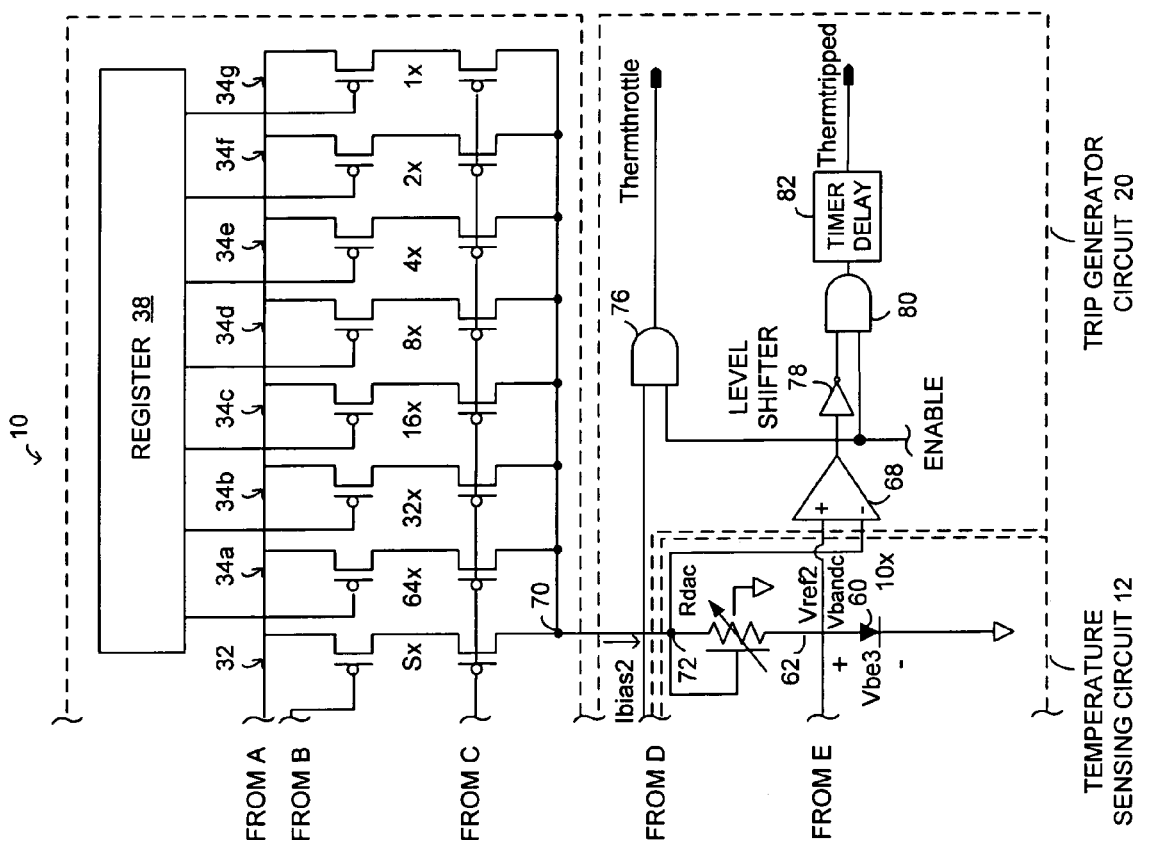

It is certified that error appears in the above-identified patent and that said Letters Patent is hereby corrected as shown below:

Column 1
Line 34, "Fig. 2 illustrates..." should read --Figs 2A and 2B illustrates...--.

Column 16
Lines 3-4, "1. ...voltage circuit coupled the current sources circuit..." should read --1. ...voltage circuit coupled to the current sources circuit...--.

Column 17
Lines 11-12, "8. ...two reference signal in response the reference current; and..." should read --8. ...two reference signals in response to the reference current; and...--.
Lines 25-26, "9. ...voltage circuit coupled the current sources circuit..." should read --9. ...voltage circuit coupled to the current sources circuit...--.
Lines 32-33, "9. ...has been reduced or exceeded;..." should read --9. ...has been reached or exceeded;...--.

Column 18
Line 1, "13. ...a reference signaling response..." should read --13. ...a reference signal in response...--.
Line 41, "16. ...nodes separated by..." should read --16. ...nodes being separated by...--.
Line 59, "18. ...a thermal sensor coupled the processor, ..." should read --18. ...a thermal sensor coupled to the processor, ...--.

Column 19
Line 10, "18. ...signaling response..." should read --18. ...signal in response...--.
Lines 12-13, "18. ...voltage circuit coupled the current sources circuit..." should read --18. ...voltage circuit coupled to the current sources circuit...--.
Lines 13-14, "18. ...signaling response..." should read --18. ...signal in response...--.
Lines 16-17, "18. ...configured red to generate..." should read --18. ...configured to generate...--.

Signed and Sealed this
Seventh Day of June, 2011

David J. Kappos
*Director of the United States Patent and Trademark Office*